Aug. 4, 1931.  F. L. JOHNSON  1,817,515
COLLAPSIBLE CORE
Filed Aug. 5, 1929  2 Sheets-Sheet 1

INVENTOR
FRANK L. JOHNSON.
BY
Ely & Barrow
ATTORNEYS.

Aug. 4, 1931.  F. L. JOHNSON  1,817,515
COLLAPSIBLE CORE
Filed Aug. 5, 1929  2 Sheets-Sheet 2
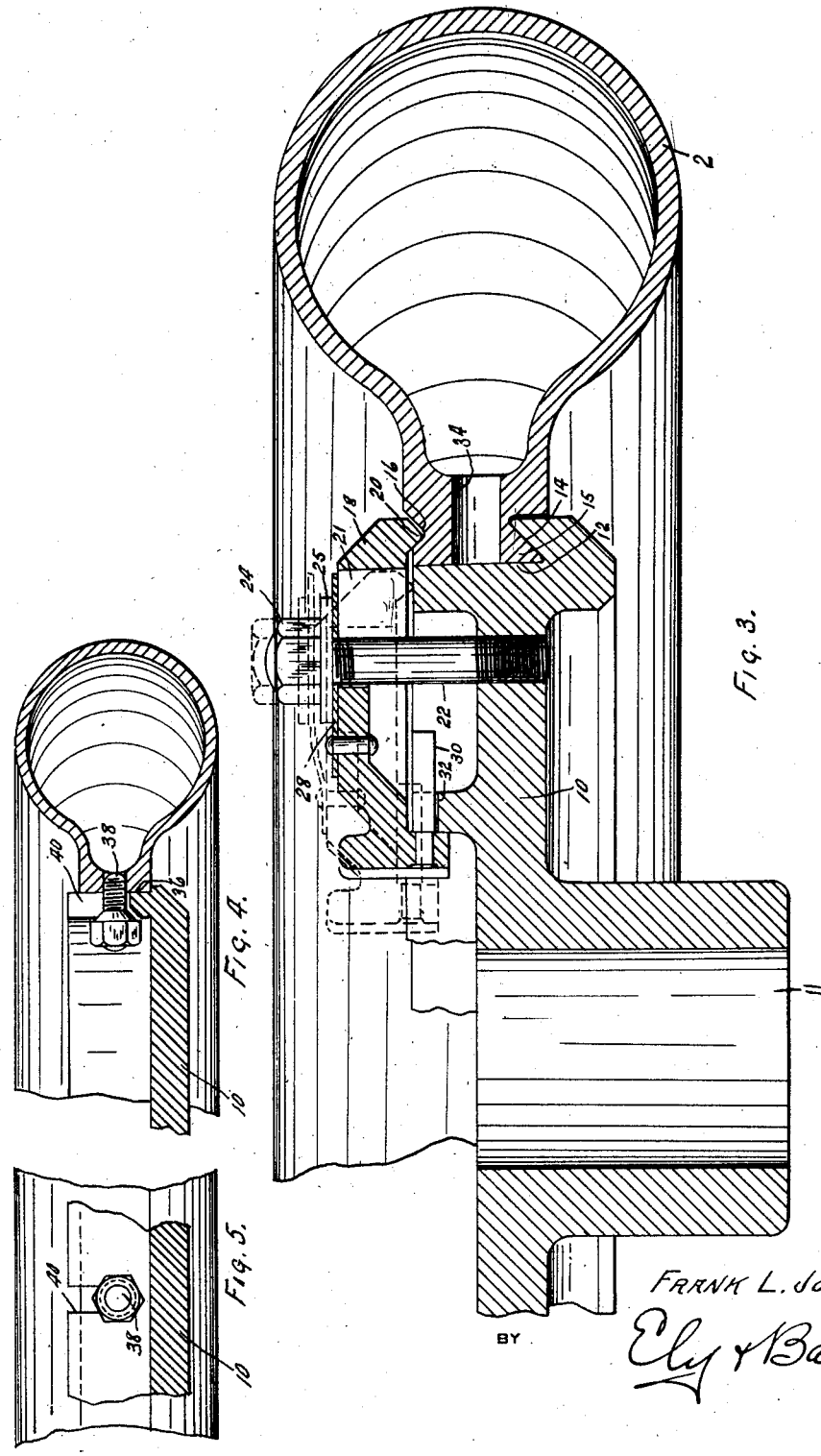
INVENTOR
FRANK L. JOHNSON.
BY
Ely & Barrow
ATTORNEYS.

Patented Aug. 4, 1931

1,817,515

UNITED STATES PATENT OFFICE

FRANK L. JOHNSON, OF AKRON, OHIO

COLLAPSIBLE CORE

Application filed August 5, 1929. Serial No. 383,512.

The present invention relates to the art of building pneumatic tires for automobiles, trucks or the like, and particularly to the construction of collapsible cores or forms upon which the said tires are built.

The invention relates especially to cores of large cross section and small internal or bead diameters to manufacture tires, such as used on heavy trucks, busses or commercial vehicles. In cores of this type, it has been difficult, owing to the bulk of the core sections to design a successful collapsing device or mechanism, and it is the object of the invention to design and construct a practical core of this type which may be easily and quickly assembled for the building of the tire thereon, the several sections or segments of the core being accurately positioned and aligned. It is also possible with the improved core shown herein to separate and remove the sections rapidly and efficiently.

The invention secures a simple and practical collapsible core, which may be used in the building of the large tires referred to, although it is not necessarily limited to that definite use, the principles of the invention being applicable to all sizes of tire building cores. Neither is the invention limited to use with tire building cores, as distinguished from drums, but may be adapted for use with any collapsible building form.

The drawings herein and the specification illustrate the best known embodiment of the invention and are not intended as indicating the limits thereof, as changes and modifications may be made in specific embodiments of the invention, without sacrificing any of the benefits or advantages thereof.

In the drawings,

Figure 3 is an enlarged view showing the details of the mechanism for clamping the core sections to the central chuck or plate; and Figures 4 and 5 are details of a modification.

The core or form comprises a body which is of the required cross section for the manufacture of the tire therein. As shown, it is in the form of the usual rounded section, although the profile thereof may be altered or varied.

Figure 1:
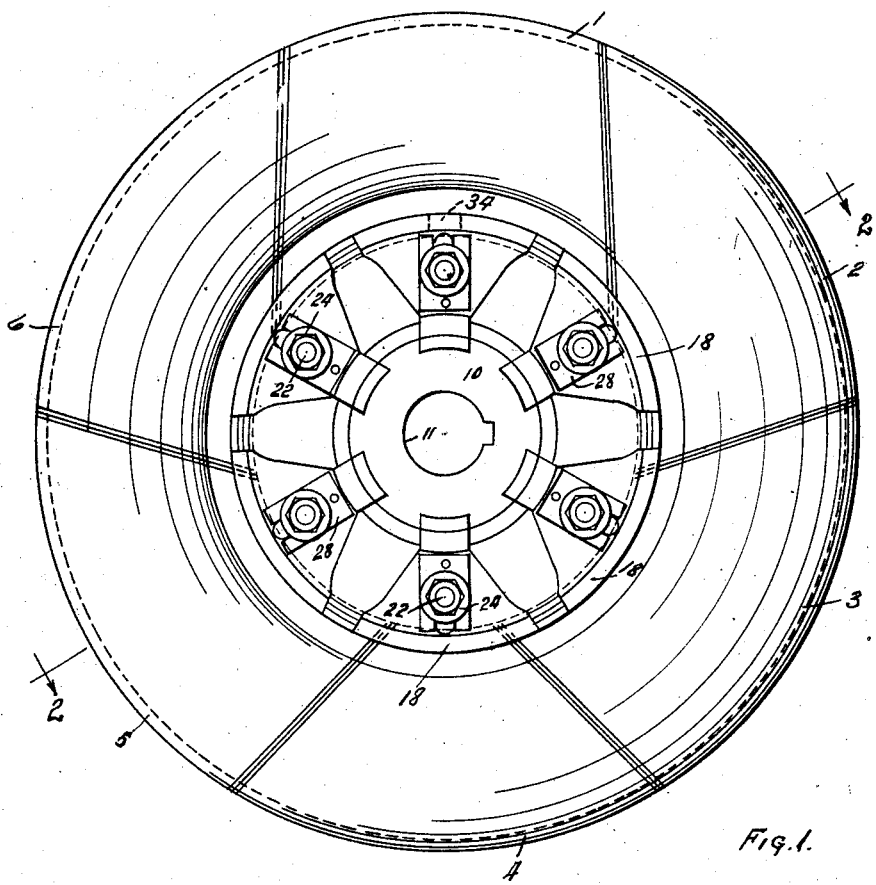
Figure 1 is a plan view of the assembled core in the form in which the tire is to be built.
Figure 2:
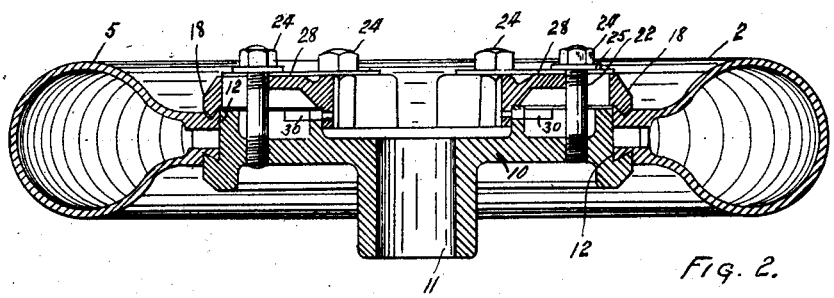
Figure 2 is a vertical section on the line 2—2 of Figure 1.

The core body is cut or divided into a plurality of segments or sections according to the manner in which the core is to be disassembled, and according to the size or bulk thereof. A satisfactory design for this purpose is shown in Figure 1, wherein, the core is divided into six sections designated by the numerals 1 to 6 inclusive. The section 1 may be termed the key section, as it is the first section to be moved in collapsing the core, being provided with sides which converge outwardly so that the section can be removed from the finished tire. The remaining sections may be divided as found necessary or advisable, the lines of division which are shown being satisfactory for the purpose.

Located centrally of the core is the central supporting plate or chuck 10 which is provided with the opening 11 therein, by means of which the core may be mounted on the shaft of the tire building machine or stand, and by which the core may be rotated.

The outer surface or periphery of the central plate is formed with an annular surface or face 12, which may taper as shown, and each of the core sections is formed in its inner face with a corresponding surface adapted to rest against and register on the surface 12. About the seating surface or register, the supporting plate is provided with an undercut angularly shaped rib 14, forming an angular groove in which is receivable the angular web or dovetail 15 on the base or tongue of the core section.

On the opposite side of the tongue on the core section is formed the angular groove or recess 16. Located around the central supporting plate are the series of radial clamps 18 which may be fan shaped as shown, so that the outer edge of each clamp extends over a considerable surface. As shown, certain of these clamps embrace more than one core section. The outer edge of each clamp is formed with a nose or angular rib 20, which seats in the groove 16. Each clamp is formed with a radial slot 21 which passes over a bolt 22 seated in the core plate. A nut 24 is screwed upon the outer end of the bolt, a washer 25 being located beneath the nut. A light spring plate 28 is located below the nut and washer and a guiding pin 30 may be set in each clamp, the pin engaging a notch 32 in the core plate so that the clamp moves radially when being tightened. The slot and pin are of sufficient length so that the clamps may be moved down into a position to clear the core segments, without disassembling the clamps.

It will be seen that when the core segments are located in position and the clamps applied, the sections are drawn down against the register or the central plate, insuring a position alignment of the core sections about the central plate. In previous constructions, the cores have been held upon the core shaft by means of expanding chucks, but the present construction provides for the pulling in of the core sections against the central register or cylindrical surface 12. As a result a perfectly circularity of the core is obtained. The core sections are formed and securely clamped about the central supporting plate or chuck and the completed core is balanced evenly and will run smoothly upon its axis. In removing the tire, the clamps are released and the collapsible core with the tire thereon is removed from the central plate, whereupon the sections can be removed from the tire.

The key section 1 may be provided with a recess 34 in which a lever or grappling hook may be received for the purpose of pulling out the key sections.

In the form shown in Figures 4 and 5, each core section may be drawn down upon the register 36 on the chuck plate by stud bolts or screws 38 which work in the slots 40 on the chuck plate 10.

It will be apparent that other means may be devised for drawing down and clamping the core sections in the register about the chuck plate, but it is believed that the clamps shown and described will serve the purpose to better advantage than other mechanisms.

What is claimed is:

1. A collapsible tire building form, comprising a central supporting plate, an outer radial registering surface thereon, an annular wedge ring on said radial registering surface, a plurality of separable sections, and means for drawing the sections against the wedge ring and register and clamping them in such position.

2. A sectional core for the purpose set forth, comprising a central core plate adapted to be received over the shaft of a tire machine, a registering surface on the outer periphery thereof and an outstanding flange, a plurality of core sections, the inner portion thereof being adapted to seat upon the registering surface against the flange, and clamps to secure the core sections in position, the clamps being provided with wedging surfaces adapted to draw the sections toward the axis of the core as they are tightened.

3. A sectional core for the purpose set forth, comprising a central core plate adapted to be received over the shaft of a tire machine, a registering surface on the outer periphery thereof and an outstanding flange, a plurality of core sections, the inner portion thereof being adapted to seat upon the registering surface against the flange, and clamps to secure the core sections in position, the clamps and the flange being provided with wedging surfaces adapted to draw the sections toward the axis of the core as they are tightened.

4. A core comprising a central supporting plate, a sectional core body separable therefrom, the plate having an outer core register, and means movable parallel with the axis of the core body to draw the section radially inwardly and against the register.

5. A collapsible tire building core, comprising a central circular supporting plate, having an outer surface which is adapted to serve as a register, and a plurality of core sections located around the plate, and wedging means to secure the sections in position.

6. A collapsible tire building core, comprising a central chuck having an outer conical surface thereon, an upstanding undercut flange at one side thereof, a plurality of core sections each having a tongue adapted to seat upon the curved surface, each tongue being dovetailed in cross section, and a plurality of clamps attached to the core plate, each clamp having a wedge shaped outer end to engage one side of the dovetailed portion of the core sections, the opposite side being located beneath the undercut flange.

7. A collapsible tire building core, comprising a central chuck having an outer conical surface thereon, an upstanding undercut flange at one side thereof, a plurality of core sections each having a tongue adapted to seat upon the curved surface, each tongue being dovetailed in cross section, a plurality of clamps attached to the core plate, each clamp having a wedge shaped outer end to engage one side of the dovetailed portion of the core sections, the opposite side being located beneath the undercut flange, and means to guide the clamps for movement radially of the chuck.

8. A collapsible tire building core comprising a plate which constitutes a central supporting chuck member, a plurality of core sections encircling the chuck member, and releasable wedge clamps on the chuck member adapted to hold the core sections.

FRANK L. JOHNSON.